United States Patent
Strom

(10) Patent No.: US 9,026,180 B2
(45) Date of Patent: *May 5, 2015

(54) PORTABLE ELECTRONIC APPARATUS, AND A METHOD OF CONTROLLING A USER INTERFACE THEREOF

(71) Applicant: Unwired Planet, LLC, Reno, NV (US)

(72) Inventor: Jacob Strom, Stockholm (SE)

(73) Assignee: Unwired Planet, LLC, Reno, NV (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/735,513

(22) Filed: Jan. 7, 2013

(65) Prior Publication Data

US 2013/0122964 A1    May 16, 2013

Related U.S. Application Data

(63) Continuation of application No. 12/809,373, filed as application No. PCT/EP2008/068054 on Dec. 19, 2008, now Pat. No. 8,351,992.

(60) Provisional application No. 61/016,640, filed on Dec. 26, 2007.

(30) Foreign Application Priority Data

Dec. 21, 2007   (EP) ..................... 07150332

(51) Int. Cl.
*H04M 1/00* (2006.01)
*H04B 1/38* (2006.01)
(Continued)

(52) U.S. Cl.
CPC ............. *G06F 3/02* (2013.01); *G06F 3/0202* (2013.01); *G06F 3/03547* (2013.01);
(Continued)

(58) Field of Classification Search
USPC ............... 455/566, 457, 550.1, 556.2, 569.1; 379/93.19, 157, 419, 434; 345/169, 345/173; 715/864
See application file for complete search history.

(56) References Cited

U.S. PATENT DOCUMENTS 6,731,316 B2   5/2004   Herigstad et al.
7,317,449 B2   1/2008   Robbins et al.
(Continued)

FOREIGN PATENT DOCUMENTS

EP   1 081 922   3/2001
EP   1 197 835   4/2002
(Continued)

OTHER PUBLICATIONS

European Search Report for EP 07 15 0332, mailed May 21, 2008.
(Continued)

*Primary Examiner* — Steve D Agosta
(74) *Attorney, Agent, or Firm* — Nixon & Vanderhye P.C.

(57) ABSTRACT

A portable electronic apparatus has a display, keypad, sensor and controller. Keys of the keypad are distributed within a keypad area in at least a first plane and are arranged for user actuation transversally to the first plane to provide a first type of user input. The sensor is positioned to sense navigating user actuation at the keypad area in or coincident with the first plane to provide a second type of user input. The controller is configured to control a focus position on the display in response to the second type of user input; associate a plurality of display subareas of the display with respective keys of the keypad; and accept, for user input of the second type, user actuation of an actuated key among the keys as a selection of a selectable item presented at the focus position in a particular display subarea associated with the actuated key.

13 Claims, 6 Drawing Sheets

(51) Int. Cl.
  *G06F 3/02*     (2006.01)
  *G06F 3/0354*   (2013.01)
  *G06F 3/044*    (2006.01)
  *G06F 3/0488*   (2013.01)
  *H04M 1/23*     (2006.01)
  *H04M 1/725*    (2006.01)
  *H04M 1/22*     (2006.01)

(52) U.S. Cl.
  CPC ........... *G06F 3/044* (2013.01); *G06F 3/04886* (2013.01); *H04M 1/22* (2013.01); *H04M 1/23* (2013.01); *H04M 1/7258* (2013.01); *H04M 2250/22* (2013.01)

(56) References Cited

U.S. PATENT DOCUMENTS

2002/0047870 A1  4/2002  Carro
2003/0040341 A1  2/2003  Casais

FOREIGN PATENT DOCUMENTS

| EP | 1 262 861 | 12/2002 |
| EP | 1 688 830 | 8/2006 |
| EP | 1 770 482 | 4/2007 |
| WO | 2006/015514 | 2/2006 |

OTHER PUBLICATIONS

International Search Report for PCT/EP2008/068054, mailed Feb. 17, 2009.

PORTABLE ELECTRONIC APPARATUS, AND A METHOD OF CONTROLLING A USER INTERFACE THEREOF

RELATED APPLICATIONS

This application is a continuation of U.S. application Ser. No. 12/809,373, which was the National Stage of International Application No. PCT/EP2008/068054, internationally filed on Dec. 19, 2008, which claims the benefit of U.S. Provisional Application No. 61/016,640, filed on Dec. 26, 2007 and EP07150332.0 filed on Dec. 21, 2007. The disclosures of each of these previous applications are incorporated herein by reference in their entirety.

TECHNICAL FIELD

The present invention relates to the field of portable electronic equipment, and in particular to a portable electronic apparatus having a display and a keypad adapted both for conventional key-pressing user actuation of individual keys and for navigating user actuation within a keypad area that includes the keys. The invention also relates to a method of controlling a user interface of such a portable electronic apparatus.

BACKGROUND

Portable electronic equipment of course exists in many different types. One common example is a mobile terminal, such as a mobile telephone for a mobile telecommunications system like GSM, UMTS, D-AMPS, CDMA2000, FOMA or TD-SCDMA. Other examples include personal digital assistants (PDAs), portable media players (e.g. DVD players), palmtop computers, digital cameras, game consoles, navigators, etc. A mobile terminal in the form of a mobile telephone will be used as a non-limiting example of a portable electronic apparatus in the following.

Different kinds, or categories, of mobile terminals are currently offered on the market. A first category can be referred to as the "normal cell phone" type, having a display and a physical (mechanical) keypad with twelve keys representing digits 0-9 as well as characters * and #. This kind of keypad is commonly known as an ITU-T or a PIN-type keypad. In addition to the twelve keys, a mobile terminal of this first category often also has additional input elements, such as soft keys for call handling, etc., and input elements for display navigation, such as a set of arrow keys, a combined four or five-way navigation key, a joystick or a scroll wheel.

A further development of the first category is sometimes referred to as the "BlackBerry®" type. This type has a more extended set of keys, such as a physical keyboard of full QWERTY type (with one key for each typical key of a typewriter keyboard) or compact QWERTY type (where, for instance, each key may represent two adjacent keys of a typewriter keyboard), as well as any of the input elements for display navigation referred to above.

A different, second category of mobile terminals has a touch-sensitive display which can be operated by way of a stylus or the finger of a user. This second category, which is often referred to as "smartphone" or "PDA (personal digital assistant)", therefore does not need a physical (mechanical) keypad (although some models of this category still contain a physical keypad in addition to the touch-sensitive display).

Whereas mobile terminals of the second category certainly have their benefits, there are nevertheless some drawbacks associated with them, in terms of a large apparatus size, high electric power consumption, and a high price. For many user segments, the first category of mobile terminals is therefore still preferred, wherein improvements to such mobile terminals are still desired.

Because of market demands, mobile terminals of the first category are minimal in physical size. Whereas this is beneficial from other perspectives, there is a problem to consider when it comes to their display navigation capabilities. Navigating by means of small arrow keys or a tiny joystick on a miniaturized terminal housing may be challenging.

In EP-1 197 835, an improvement is suggested where a mobile terminal is provided with a keypad which is adapted both for conventional key-pressing user actuation of individual keys and for navigating user actuation within a keypad area that includes the keys. To this end, the keypad—which has a keymat with a conventional twelve-key, ITU-T key layout—is provided with capacitive sensing plates integrally disposed beneath the keymat. In this way, the keypad of EP-1 197 835 can be used both in a conventional manner to enter alphanumeric data by pressing individual keys of the keypad, and as a touch pad by sliding a finger over the surface of the keymat to control a focus position (e.g. the position of a cursor) on the display. In effect, the touch-sensitive keypad of EP-1 197 835 can be used in much the same way as a mouse pad on a conventional laptop computer to navigate a cursor on the display. Also, selecting actions are performed as with a mouse pad on a laptop computer, i.e. by double-tapping on the mobile terminal's touch-sensitive keypad.

A problem that can be identified with the solution according to EP-1 197 835 is that due to the typical small size of a mobile terminal, it may be difficult to position the cursor accurately at the desired focus position. This has to do both with the fact that the keypad and display are quite small compared to a laptop computer, and because the mobile terminal is typically held in a non-stationary (hand-held) position. It may thus be even harder to perform a selecting action accurately, since not only must the focus position be navigated to correctly, but it must also be maintained in its correct position between the two taps of the double-tapping.

Therefore, there is still a need for improvements to a portable electronic apparatus, such as a mobile terminal, like the one in EP-1 197 835, having a display and a keypad adapted both for conventional key-pressing user actuation of individual keys and for navigating user actuation as a touch-pad within a keypad area that includes the keys.

SUMMARY

It is accordingly an object of the invention to eliminate or alleviate at least some of the above problems referred to above.

As a conceptual idea behind the invention, the present inventor has realized that for a mobile terminal that has a keypad which functions both as a conventional keypad for key-pressing user actuation of individual keys and as a touch-pad for navigating user actuation within a keypad area that includes the keys, the selectable items in the contents presented on the display may be limited to certain subareas, more particularly to display subareas which are associated with respective keys of the keypad. Moreover, during display navigation, selecting actions may be done by depressing the particular key associated with the display subarea that contains the particular selectable item of desire.

This conceptual idea has been reduced to practice at least according to the aspects and embodiments of the invention referred to below.

One aspect of the present invention therefore is a portable electronic apparatus having:

a display;

a keypad having a plurality of keys, the keys being distributed within a keypad area in at least a first plane, and the keys being arranged for key-pressing user actuation transversally to said first plane so as to provide a first type of user input;

sensor means positioned to sense navigating user actuation at said keypad area in or coincident with said first plane so as to provide a second type of user input; and a controller configured to control a focus position on said display in response to user input of said second type, wherein the controller is configured to associate a plurality of display subareas of said display with respective keys of said keypad and to accept, for user input of said second type, a key-pressing user actuation of an actuated key among said keys as a selection of a selectable item presented at said focus position in a particular display subarea associated with said actuated key.

The second type of user input will thus typically relate to navigation in displayed contents which include a plurality of selectable items (such as icons, buttons, links or thumbnails), followed by a selection of one of these selectable items. Such navigation may involve a user moving a finger across the keypad area to control the two-dimensional focus position (e.g. cursor position) on the display. Thanks to the invention, the user's selection of the desired selectable item will be more accurate.

In some embodiments, in addition to navigation in displayed contents, the sensor means may be adapted to sense gestures performed by more than one finger, such as "pinching" with the thumb and index finger on said keypad area to command an in-zooming operation on the displayed contents, and "unpinching" with the thumb and index finger to command an out-zooming operation.

Advantageously, the sensor means is touch-sensitive, i.e. capable of sensing the user's navigating user actuation whenever the user's finger contacts the surface of the keypad area and is, thus, moved in said first plane. In one or more embodiments, the keypad comprises a keymat, wherein said touch-sensitive sensor means comprises capacitive sensing means positioned beneath said keymat.

However, alternative embodiments are envisaged where physical contact is not required; it may suffice that the user's finger is moved proximate to the surface of the keypad area, i.e. in a plane coincident with said first plane. Such alternative embodiments may for instance be based on impedance sensing technology (such as capacitive or resistive), or acoustic (such as surface acoustic wave (SAW) or acoustic pulse recognition), or optical (such as infrared or based on image processing).

In one or more embodiments, the keys of said keypad are arranged such that at least a top part thereof is tactilely sensable when a user's finger is swept over said keypad area. The keys of said keypad may be arranged to be physically depressible in a direction transverse to said first plane.

In one or more embodiments, said controller is configured, in a cursor control mode intended for input of said second type, to receive contents to be presented on said display;

determine one or more pieces of clickable content included in said contents; and for at least one piece of clickable content, rearrange this piece of clickable content with respect to the contents to be presented, such that the piece of clickable content will appear, when the contents are presented on said display, as a selectable item in a particular display subarea associated with a particular key of said keypad.

Such embodiments will improve the user's convenience by adapting the presentation of received contents (e.g. HTML data), so that selectable items are presented in as many display subareas as possible and therefore are made selectable by means of as many keys as possible.

For such embodiments, the rearranging may be performed as a result of a finding that said piece of clickable content would have appeared, when presented, at a display location which would not have fallen within any of said display subareas or at a display location which would have fallen within a display subarea that contains another piece of clickable content, and that said particular display subarea is available in the sense that it would not have contained a piece of clickable content.

In one or more embodiments, where the display subareas have predetermined display locations on said display, said controller is configured, in a cursor control mode intended for input of said second type, to determine one or more selectable items included in contents presented on said display;

compare location(s) of the determined selectable item(s) on said display to the predetermined display locations of said display subareas; and when a location of one of the determined selectable item(s) matches a predetermined display location of an available one of the display subareas, present on said display a graphical indication of the match.

This will give a visual aid to the user by showing which parts of the display that contain clickable matter selectable by the keys of the keypad.

Advantageously, the graphical indication of the match is presented as a boundary of the matching display subarea.

The controller may be configured to indicate said focus position in the form of a graphical marker symbol on said display.

The keys of said keypad may, in one or more but not necessarily all embodiments, have a layout selected from the group consisting of ITU-T, full QWERTY and compact QWERTY.

The apparatus may be embodied as a mobile terminal, advantageously a mobile telephone for a mobile telecommunications system like GSM, UMTS, D-AMPS, CDMA2000, FOMA or TD-SCDMA.

A second aspect of the invention is method of controlling a user interface of a portable electronic apparatus having a display and a keypad with a plurality of keys distributed within a keypad area in at least a first plane, by sensing a navigating user actuation at said keypad area in said first plane; and controlling a focus position on said display in response to the sensed navigating user actuation, the method further involving associating a plurality of display subareas of said display with respective keys of said keypad;

detecting a key-pressing user actuation of an actuated key among said keys in a direction transverse to said first plane; and accepting said key-pressing user actuation as a selection of a selectable item presented at said focus position in a particular display subarea associated with said actuated key.

The method according to the second aspect may generally have any functional feature identical with or corresponding to any of the features referred to above for the apparatus according to the first aspect.

It should be emphasized that the term "comprises/comprising" when used in this specification is taken to specify the presence of stated features, integers, steps, or components, but does not preclude the presence or addition of one or more other features, integers, steps, components, or groups thereof.

Objects, features and advantages of embodiments of the invention will appear from the following detailed description and accompanying drawings.

DETAILED DESCRIPTION

Figure 1:
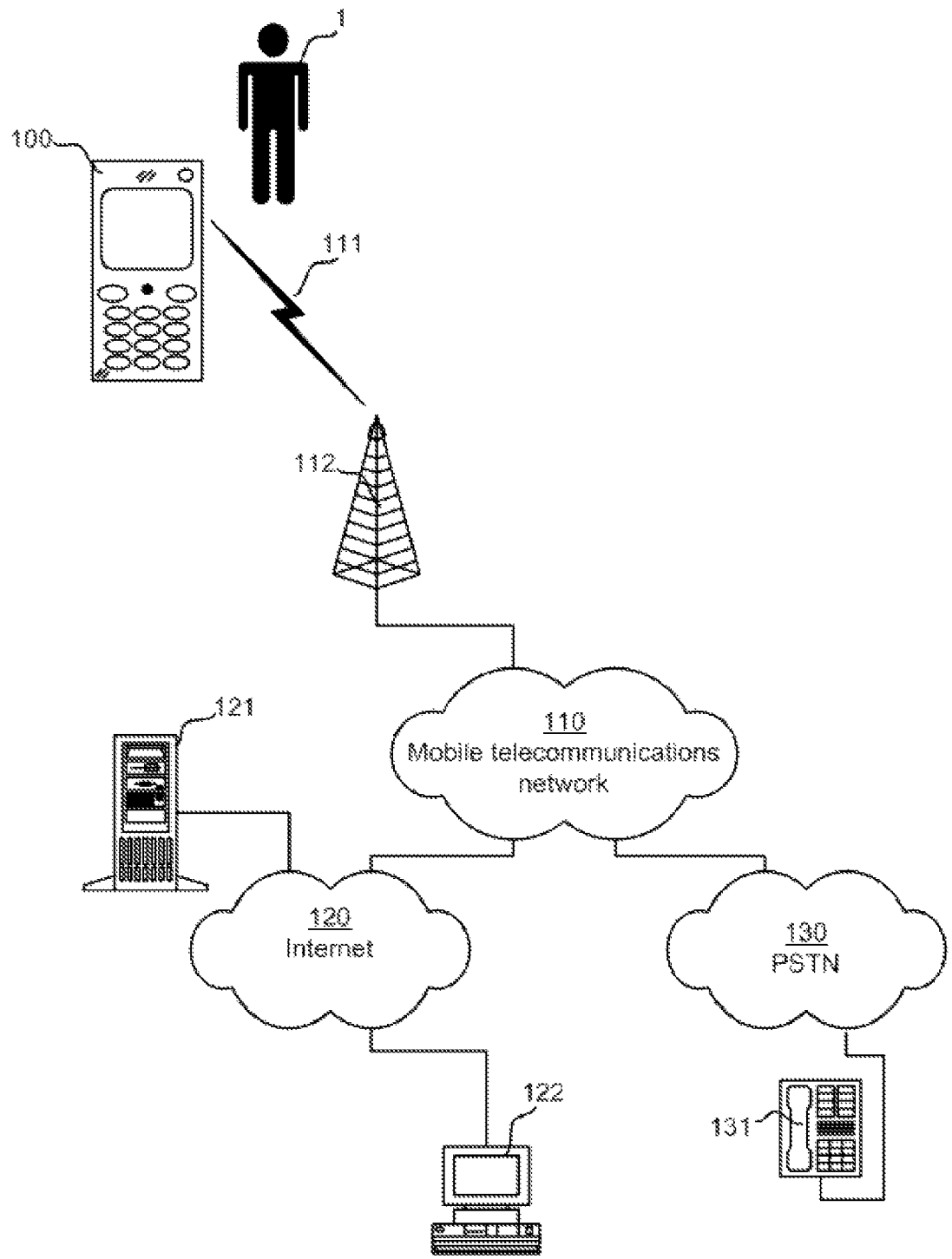
FIG. 1 is a schematic illustration of a non-limiting example of an environment in which embodiments of the present invention may be exercised.

Embodiments of the invention will be now described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, an exemplifying environment in which they may be exercised will now be briefly described with reference to FIG. 1.

In FIG. 1, a portable electronic apparatus in the form of a mobile terminal 100 is part of a cellular telecommunications system. A user 1 of the mobile terminal 100 may use different telecommunications services, such as voice calls, Internet browsing, video calls, data calls, facsimile transmissions, still image transmissions, video transmissions, electronic messaging, and e-commerce. These described telecommunication services are however not central within the context of the present invention; there are no limitations to any particular set of services in this respect.

The mobile terminal 100 connects to a mobile telecommunications network 110 over a radio link 111 and a base station 112. The mobile terminal 100 and the mobile telecommunications network 110 may comply with any commercially available mobile telecommunications standard, including but not limited to GSM, UMTS, D-AMPS, CDMA2000, FOMA and TD-SCDMA. As already mentioned, embodiments of the mobile terminal 100 will be described in more detail later with reference to the remaining drawings.

A conventional public switched telephone network (PSTN) 130 is connected to the mobile telecommunications network 110. Various telephone terminals, including a stationary telephone 131, may connect to the PSTN 130.

The mobile telecommunications network 110 is also operatively associated with a wide area data network 120, such as the Internet. Server computers 121 and client computers 122 may be connected to the wide area data network 120 and therefore allow communication with the mobile terminal 100.

Figure 2:
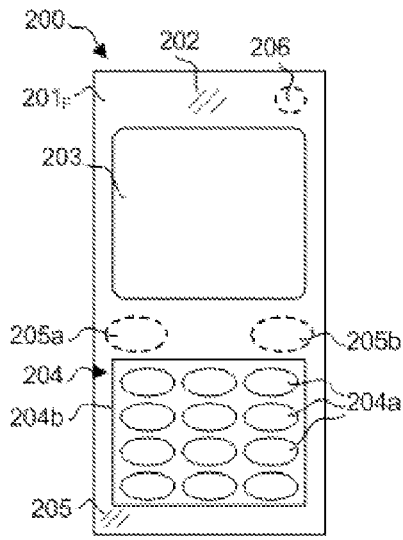
FIG. 2 is a schematic front view of a portable electronic apparatus according to a first embodiment of the present invention, having a keypad which functions both as a conventional keypad for key-pressing user actuation of individual keys so as to provide a first type of input, and as a touchpad for navigating user actuation so as to provide a second type of input.

An embodiment 200 of the mobile terminal 100 is illustrated in more detail in FIG. 2. The mobile terminal 200 has a housing that includes a front side $201_F$. The front side $201_F$ has a user interface or MMI that involves a speaker or earphone 202, a microphone 205, a display 203, and an ITU-T-type keypad 204 having twelve alpha-numeric keys distributed within a keypad area 204b, the keys representing the digits 0-9 and the characters * and #. Certain other special keys such as soft keys 205a, 205b may also be provided. Furthermore, a camera 206 may be mounted on the front side $201_F$. Other well-known external components may also be provided, such as power switch, battery, charger interface, accessory interface, volume controls and external antenna, but are not indicated in FIG. 2 for the sake of brevity.

Figure 3:
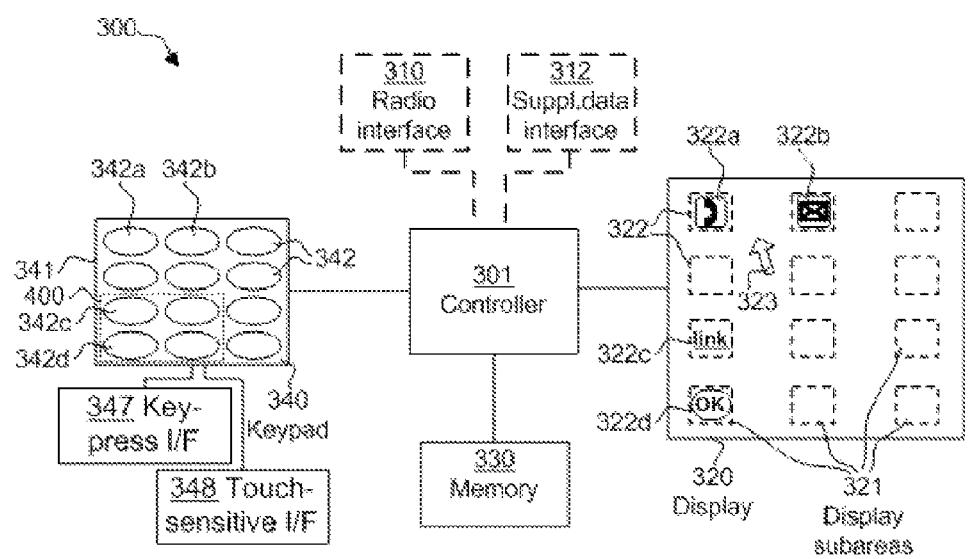
FIG. 3 is a schematic block diagram representing the major components, within the context of the present invention, of a portable electronic apparatus according to one embodiment.

The internal component structure of a portable electronic apparatus according to one embodiment will now be described with reference to FIG. 3. The embodiment of FIG. 3 may, but does not have to, be the mobile terminal 200 of FIG. 2. The portable electronic apparatus 300 of FIG. 3 has a controller 301, which is configured to receive input from a keypad 340 (for instance the keypad 204 of the mobile terminal 200) and control a display 320 (for instance the display 203 of the mobile terminal 200) accordingly. Thus, the controller 301 is configured to control a user interface (MMI) of the apparatus, the user interface including the keypad 204 and the display 203. Particulars of how the controller 301 may interact with the keypad 340 and display 320 when implementing the inventive idea will appear clearly from the description below.

The controller 301 may be implemented by any commercially available and suitably programmed CPU ("Central Processing Unit") or DSP ("Digital Signal Processor"), or alternatively by any other electronic logic device such as an FPGA ("Field-Programmable Gate Array"), an ASIC ("Application-Specific Integrated Circuit") or basically any combination of digital and/or analog components which, in the mind of a skilled person, would be a natural choice in order to implement the disclosed functionality. In some embodiments it may be combined with, i.e. realized by, a main controller that is responsible for the overall operation of the apparatus.

The controller 301 also includes, is coupled to or otherwise associated with a memory 330. The memory 330 may be realized by any available kind of memory device, such as a RAM memory, a ROM memory, an EEPROM memory, a flash memory, a hard disk, or any combination thereof. The memory 302 may be used for various purposes by the controller 301 as well as by other controllers in the portable electronic apparatus (such as the aforementioned main controller, if applicable), including but not limited to storing data and program instructions for various software in the portable electronic apparatus.

Particularly for embodiments where the portable electronic apparatus 300 is a mobile terminal, like the mobile terminal 200 referred to above, the software stored in memory 330 may include a real-time operating system, drivers for the user interface, an application handler as well as various applications. The applications may include applications for voice calls, video calls and messaging (e.g. SMS, MMS, fax or email), a phone book or contacts application, a WAP/WWW browser, a media player, a calendar application, a control panel application, a camera application, video games, a notepad application, etc.

Furthermore, still with reference to embodiments where the portable electronic apparatus 300 is a mobile terminal, the apparatus typically has a radio interface 310. The radio interface 310 will comprise an internal or external antenna as well as appropriate electronic radio circuitry for establishing and maintaining a wireless link to a base station (for instance the radio link 111 and base station 112 in FIG. 1). As is well known to a man skilled in the art, such electronic radio circuitry may comprise analog and digital components that constitute a radio receiver and transmitter. These components may include band pass filters, amplifiers, mixers, local oscillators, low pass filters, AD/DA converters, etc. The radio interface typically also includes associated communication service software in the form of modules, protocol stacks and drivers. Typically but optionally, the apparatus will also include one or more interfaces 312 for short-range supplemental data communication, such as a Bluetooth interface, an IrDA (infrared) interface or a wireless LAN (WLAN) interface.

Figure 4A:
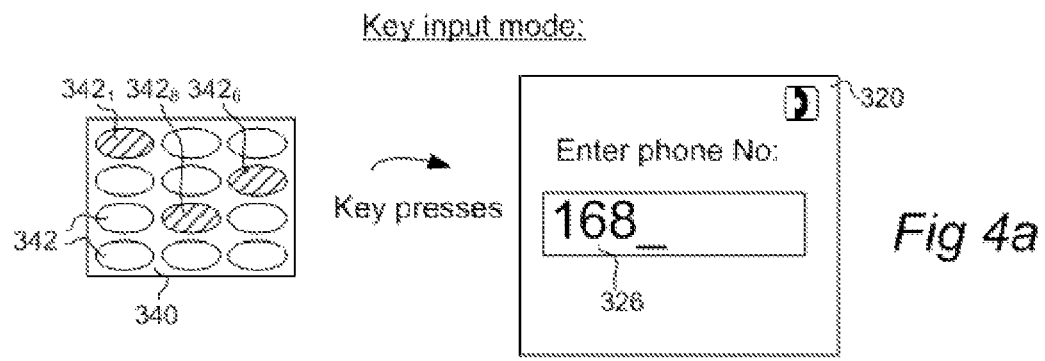
FIG. 4a illustrates the operation of the keypad and the display of the portable electronic apparatus in a key input mode where the first type of input is provided.
Figure 4B:
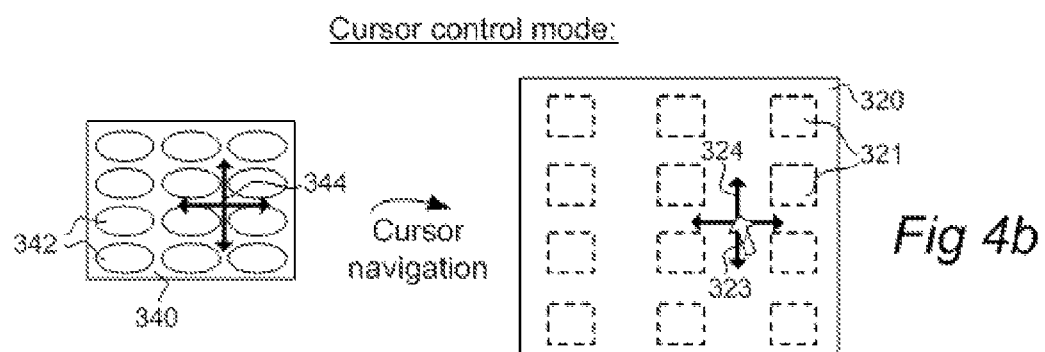
FIGS. 4b-c illustrate the operation of the keypad and the display of the portable electronic apparatus in a cursor navigation mode where the second type of input is provided.
Figure 4C:
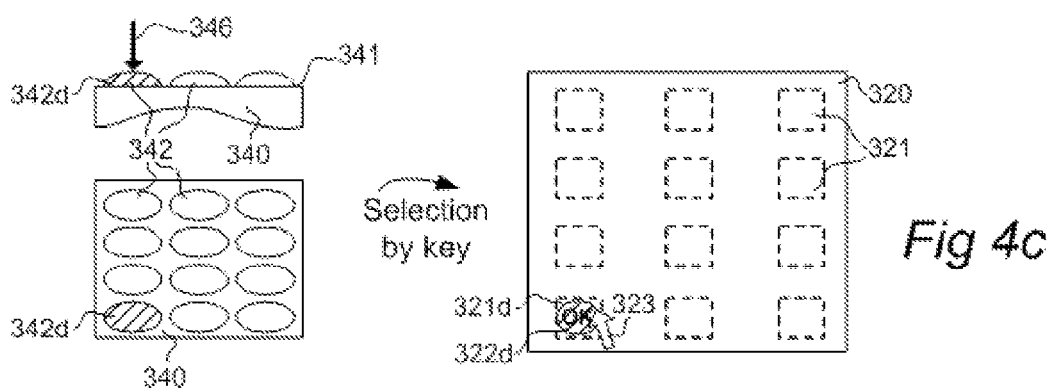

Reference is now also made to FIGS. 4a-c. The keypad 340 has dual functions, or, alternatively put, is operable is two different input modes. Thus, one function of the keypad 340 is as a conventional keypad for key-pressing user actuation of individual keys 342 to provide a first type of input in a key input mode (FIG. 4a), whereas a second function of the keypad 340 is to act like a touchpad for navigating user actuation within a keypad area 341 to provide a second type of input in a cursor control mode (FIGS. 4b-c).

Thus, the first type of input may relate to the dialing of a telephone number, or the entering of a number in a calculator application, or the writing of characters for an SMS message, etc., performed by the user 1 in a manner well known per se by pressing different keys 342 in sequence. The keypad has key-press interface circuitry 347 for detecting depressing of individual keys 342 in a direction transversally to the plane of the keypad area 341 and for forwarding the detected input to the controller 301. FIG. 4a illustrates an example where the user 1 sequentially presses the keys $342_1$, $342_6$ and $342_8$ to enter the partial telephone number "168", as seen at 326 on the display 320.

The second type of input involves navigating and selecting among selectable items 322 shown on the display 320. The selectable items may, for instance, pertain to icons 322a-b, links 322c, buttons 322d, thumbnails, etc. To this end, the keypad 340 is provided with sensor means including touch-sensitive interface circuitry 348 capable of detecting navigational movements 344 performed e.g. by the user 1 sliding a finger over the top of the keys 342 within the keypad area 341.

The navigational movements 344 may occur in any given direction in the plane of the keypad area 341 (not just the four orthogonal directions seen at 344 in FIG. 4b). One embodiment of the touch-sensitive keypad 340 will be explained in more detail later with reference to FIG. 5.

In the cursor control mode, the navigational movements 344 on the keypad 340 are detected by the touch-sensitive interface circuitry 348 and forwarded to the controller 301, which will control or move 324 a focus position 323 on the display 320 accordingly, as seen in FIG. 4b. In FIG. 4b, the focus position 323 is graphically indicated as an arrow-shaped cursor symbol.

In accordance with the inventive idea, the selectable items 322a-d among the contents presented on the display 320 are limited to certain display subareas 321a-d. More particularly, the display subareas 321a-d are associated with respective keys 342a-d of the keypad 340, such that one subarea 321a is associated with one key 342a, etc.

Advantageously, the disposition of the display subareas 321 of the display 320 conforms to the disposition of the keys 342 on the keypad 340; in other words, because of the 4×3 matrix arrangement of the keys 342, the display subareas 321 will also have a 4×3 matrix arrangement on the display 320. The shape, relative location and size of the subareas 321 may vary between different embodiments; for instance, FIGS. 3 and 4a-c show rectangular display subareas 321, whereas FIG. 6 shows circular subareas 321.

Since selectable contents are confined to the display subareas 321, the user 1 conveniently performs a selecting action in the cursor control mode by pressing the appropriate key—namely the particular key with which the particular display area is associated that contains the selectable item of desire. Advantageously, the top parts of the keys 342 of the keypad 340 are arranged such that they protrude slightly from the plane of the keypad area 341 and therefore are tactilely sensable, when the user's finger is swept over the keypad 340. This has the advantage of giving a tactile orientation aid to the user 1; by feeling the protruding keys, he will know whether or not he is at a position where a selectable item can be selected by pressing the key in question.

FIG. 4c shows an example where the user 1 has navigated the focus position 323 such that the cursor falls within the display subarea 321d, in which a selectable button 322d is shown. Being located at the lowermost and leftmost matrix position on the display 320, the display subarea 321d is associated with the corresponding key 342d at the lowermost and leftmost key position among the keys 342 in the keypad area 341. Therefore, by pressing the key 342d in a direction 346 transversally to the plane of the keypad area 341, the selection of the button 322d is detected and registered by the touch-sensitive interface circuitry 348 and the controller 301, and the latter will report this event to the active software application or operating system.

Figure 5:
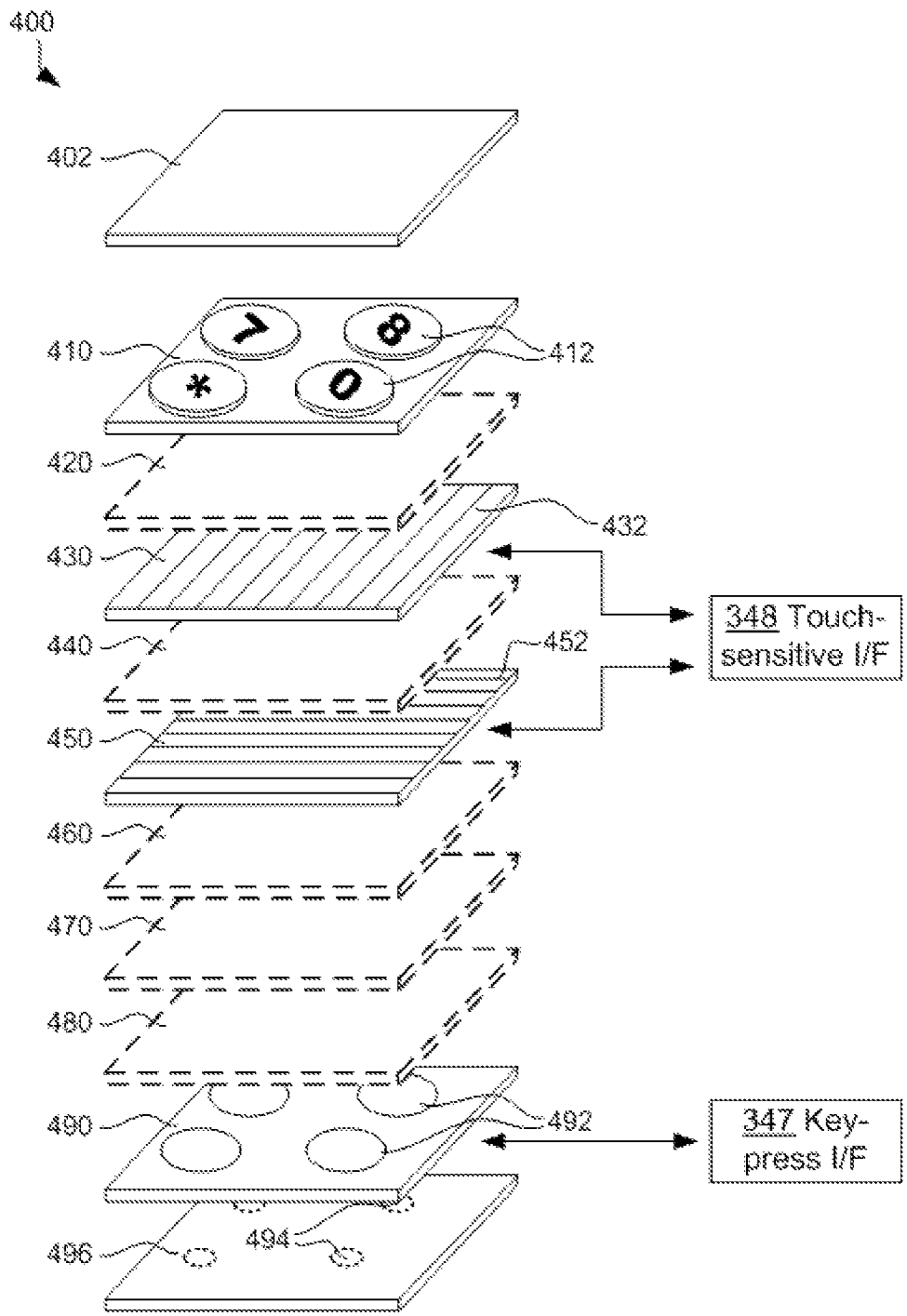
FIG. 5 is a schematic, perspective and fractioned view of the composition of a keypad with touch-sensitive sensor means according to one embodiment of the portable electronic apparatus.

With reference to FIG. 5, the composition of the keypad 340 according to one embodiment will now be described. FIG. 5 shows, in schematic perspective view, a cut-away portion 400 of the keypad 340 (see FIG. 3). In this embodiment, the keypad 340 has a keymat 410, made for instance of a silicone rubber and comprising a plurality of key caps 412. Each key cap 412 thus forms a respective one of the aforementioned keys 342. Visual indications may be provided in the top surfaces of the key caps 412 to represent, for instance, the typical characters 0-9, * and # of an ITU-T-type keypad, and a protective coating 402 is provided on top of the key caps. To make the key caps tactilely sensable for the user 1, the protective coating 402 is preferably made of a thin, flexible material.

In the embodiment of FIG. 5, first and second sensor plates 430 and 450 are provided beneath the keymat 410 and form a capacitive sensor means which, together with the touch-sensitive interface circuitry 348, makes it possible to sense navigating user interaction at the keypad area 341 to provide the afore-mentioned second type of user input. To this end, the first sensor plate 430 has a first plurality of electrodes 432 which are spaced apart and run in parallel to each other in a first direction. The second sensor plate 450 has a second plurality of spaced-apart electrodes 452 which run in parallel to each other in a second direction, orthogonal to the first direction. The electrodes 432, 452 are made of a suitable conductive material, such as metal or conductive polymer, provided on a suitable substrate. When the user 1 touches the keypad 340 (without exerting enough force to depress the key caps 412), a mutual capacitance will occur at an intersection between one of the first electrodes 432 and one of the second electrodes 452, by means of which the current position of the user's finger on the keypad 342 can be determined.

To make it possible to detect when the key caps 412 are depressed, a dome foil layer 490 is provided at the bottom of the keypad structure on top of a suitable substrate 496 and protected by a gasket layer 480. The dome foil layer 490 has a plurality of collapsible domes 492, each corresponding to a respective one of the key caps 412. When a key cap is depressed, it will actuate the respective dome and cause it to collapse. The underside of the collapsed dome will actuate a switch 494 on the underlying substrate 496. Together with the key-press interface circuitry 347, it will therefore be possible to detected key presses to provide the afore-mentioned first type of user input (as described for instance for the key input mode with reference to FIG. 4a), and also to detect a selection of an item presented on the display 320 by way of a key press (as described for instance for the cursor control mode with reference to FIGS. 4b-c).

Intermediate adhesive and support layers 420, 440 and 460 may be provided between the layers described above. To provide illumination of the keymat 410, an electroluminescent layer 470 may be provided on top of the dome foil layer 490 and gasket layer 480.

It is to be noticed that the layers are only shown schematically in FIG. 5 and all with the same thickness; in a real implementation, however, the layers will typically not be of the same width.

The composition of the keypad with its touch-sensitive interface circuitry described above is not the only possible design. On the contrary, alternative embodiments may be based on other touch-sensitive technologies, such as any of the multi-touch technologies that are already known per se in the field of portable electronic equipment, being capable of sensing the touch of more than one finger at the same time. Thus, the keypad may have a multi-touch sensor overlay on top of the keys in some embodiments. As is realized by a skilled person, such multi-touch technology may for instance involve capacitive detection, or optical detection with image recognition. With alternative embodiments like these, the user may advantageously be allowed to perform gestures on the keypad area, such as "pinching" with the thumb and index finger on the keypad area to command an in-zooming operation on the contents displayed, and "unpinching" with the thumb and index finger to command an out-zooming operation.

Figure 6A:
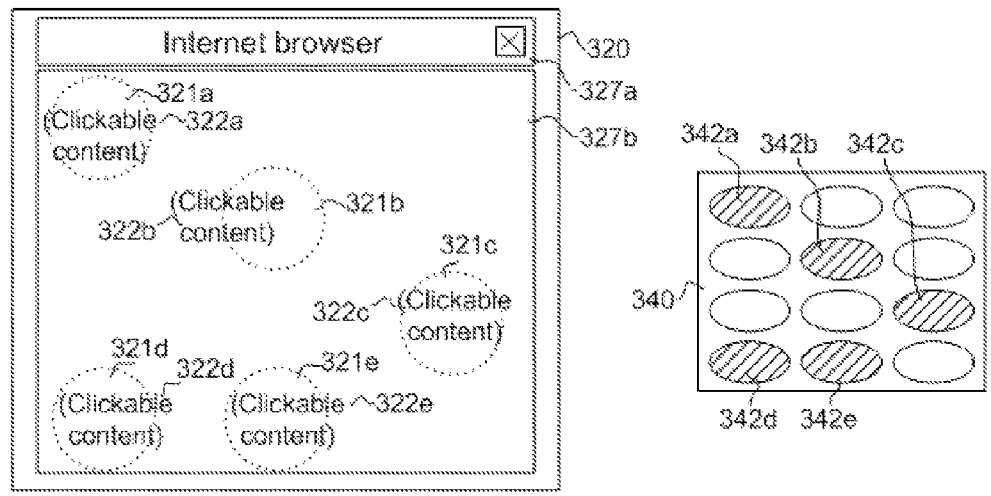
FIG. 6a is a schematic illustration of how the functionality of one embodiment may appear to a user of an Internet browser application when run on the portable electronic apparatus.

FIG. 6a illustrates an example of how the functionality according to the inventive idea may appear when an Internet browser application is run on the portable electronic apparatus 300. In this example, the Internet browser application displays a window having a head part 327a and a main part 327b on the display 320. In the FIG. 6a example, the controller 301 is configured to facilitate for the user 1 by visually indicating the presence of each selectable item 322a-322e and its availability for selection by means of the associated key 342a-e. This is indicated by graphically presenting the boundary of each display subarea 321a-e that contains a selectable item 322a-322e (the boundary having the appearance of a dashed circle in FIG. 6a). To this end, the controller 301 may be configured, in the cursor control mode, to analyze received HTML contents that is to be rendered by the Internet browser and determine the parts that represent clickable contents (e.g. http or ftp links, or objects associated with such links). Once these have been determined, the display controller will compare the locations of the thus determined clickable contents on the display to see if they fall within any of the predetermined locations of the display subareas 321. If a clickable content at least partly falls within a display subarea, it will be registered as a selectable item 322a-322e, and this status will be indicated by graphically presenting the boundary of the display subarea 321a-321e in question.

Thus, the user 1 is given visual aid by showing which parts 321a-e of the display 320 that contain clickable contents which is selectable 322a-e by the keys 342a-e of the keypad 340. When the display contents is changed (for instance if the user browses to a new web page, or navigates to another part of an image being too big to be shown all at once on the display), the controller 301 will again perform the activities above to determine which display subareas 321 that contain selectable items and therefore should be graphically indicated to the user 1.

In an alternative embodiment, the controller 301 is configured to optimize the user's convenience by adapting the presentation of received contents (e.g. HTML data), so that selectable items are presented in as many display subareas 321 as possible and therefore are made selectable by means of as many keys 342 as possible.

In order to achieve this, the controller 301 will determine, as above, one or more pieces of clickable content included in the received contents. If it is found that such a determined piece of clickable content would appear, when the received contents would be rendered and presented, at a display location which would not fall within any of the predetermined display subareas 321 or at a display location which would fall within a display subarea 321 that contains another piece of clickable content, and if there is at least one available display subarea that would not contain a piece of clickable content, then the controller 301 may rearrange the determined piece of clickable content to have a location which will indeed, when presented on the display 320, appear within such an available display subarea. The thus rearranged piece of clickable content will therefore appear as a selectable item 322a-e in one of the available display subareas 321a-e and may be selected by actuation of an associated key 342a-e.

An alternative to actually rearranging the determined piece of clickable content to appear within an available display subarea is as follows. When the controller 301 finds that a certain piece of clickable content will appear, upon rendering and presentation, at a display location which does not fall within any of the predetermined display subareas 321, the controller will let this happen but also if possible allocate an available display subarea within which no piece of clickable content is presented, and reassign the particular key 342 normally associated with this available display subarea to instead and momentarily be associated with aforesaid certain piece of clickable content. In other words, the certain piece of clickable content can be selected by actuating a key 342 which normally is not associated to the location on the display 320 where the certain piece of clickable content is shown. An exemplifying situation is shown in FIG. 6b.

Figure 6B:
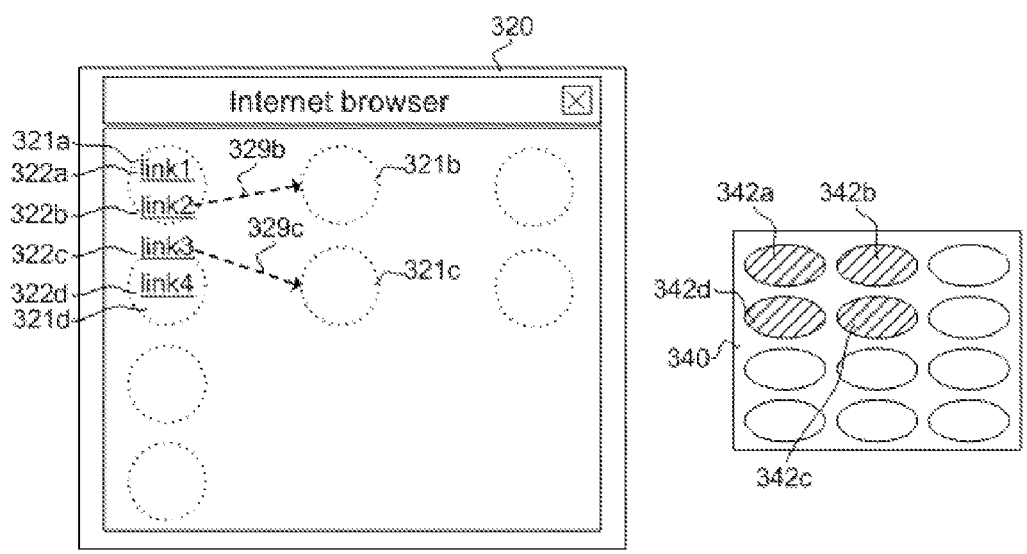
FIG. 6b is a schematic illustration of how the functionality of another embodiment may appear to a user of an Internet browser application when run on the portable electronic apparatus.

In FIG. 6b, four pieces of clickable contents are presented on the display 320, in the form of four links 322a-d ("link1"-"link4"). The first link 322a, "link1", is shown in the first display subarea 321a and is therefore selectable by means of the first (uppermost and leftmost) key 342a. However, the links are shown as a list with only a minor distance between the list items, which will mean that also the second link 322b, "link2", will be shown in the first display subarea 321a. Since this first subarea 321a is already occupied by the first link 322a and associated with the first key 342a, the second link 322b will instead be reassigned to the second key 342, because this key is normally associated with a display area 321b that currently does not contain any clickable contents and therefore is available for reassignment. Therefore, the second link 322b can be selected by pressing the second key 342b, despite the fact that it is not presented in the display subarea normally associated with that key. To make it easier for the user 1 to understand this, a visual indication 329b can be given, for instance in the form of a dashed arrow that points from the second link 322b to the display area 321b.

Since also the third and fourth links 322c-d, link3-link4, are shown in one and the same display subarea 321d, one of them will have to be reassigned to another key than the one associated with the display subarea 321d, i.e. key 342d. This situation may be resolved in the corresponding manner as above, i.e. by reassigning the third link 322c, link3, to a third key 342c which is available but is not the one that would normally have been used for selection of the third link. A visual indication 329c of this reassignment is given to the user 1. The fourth link 322d, link4, will keep its normal assignment with the key 342d.

Figure 7:
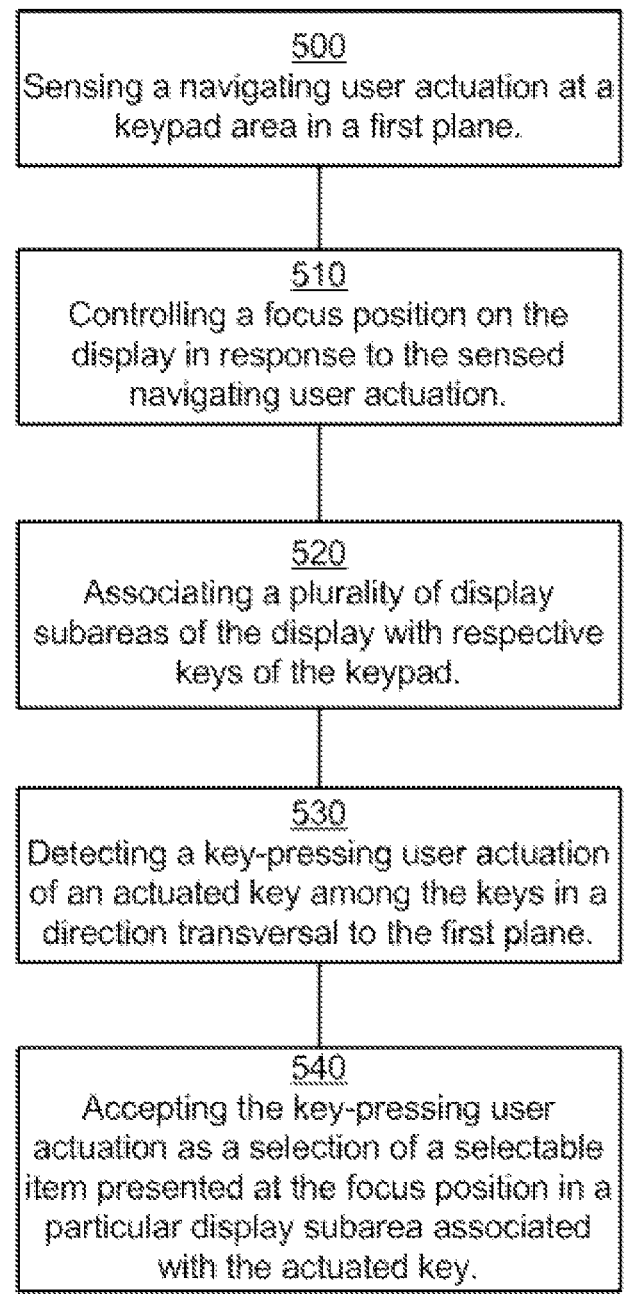
FIG. 7 is a schematic flowchart of a method according to one embodiment of the present invention.

A method according to one embodiment of the present invention is shown in FIG. 7.

In the embodiments disclosed above, the portable electronic apparatus of the invention has been described as a mobile terminal, in particular a mobile telephone. Generally, however, the portable electronic apparatus of the invention may be embodied as or included in various portable electronic equipment, including but not limited to a personal digital assistant (PDA), a portable media player (e.g. a DVD player), a palmtop computer, a digital camera, a game console, or a navigator. Thus, even though the disclosed embodiments have a keypad with a key layout that conforms to ITU-T, other embodiments with other keypads and key layouts are equally possible, including but not limited to full QWERTY type or compact QWERTY type.

In addition to the input arrangement according to the invention, there may be circumstances in real implementations of the portable electronic apparatus where also other ways of performing selecting actions may be provided. Thus, a portable electronic apparatus according to the invention does not necessarily have to provide selecting actions only in the manner described, it may also allow other kinds of complementary selection actions, such as double-tapping, pressing a dedicated "select" button, giving a selecting voice control command, etc.

The invention has, consequently, been described above with reference to some embodiments thereof. However, as is readily understood by a skilled person, other embodiments are also possible within the scope of the present invention, as defined by the appended claims.

What is claimed is:

1. A portable electronic apparatus having:
   a display;
   a keypad having a plurality of keys, the keys being distributed within a keypad area in at least a first plane, and the keys being arranged for key-pressing user actuation transversally to the first plane so as to provide a first type of user input;
   a sensor positioned to sense navigating user actuation at the keypad area in or coincident with the first plane so as to provide a second type of user input; and
   a controller configured to:
   control a focus position on the display in response to user input of the second type;
   associate a plurality of display subareas of the display with respective keys of the keypad; and
   accept, for user input of the second type, a key-pressing user actuation of an actuated key among the keys as a selection of a selectable item presented at the focus position in a particular display subarea associated with the actuated key,
   wherein the controller is configured, in a cursor control mode intended for input of the second type, to:
   receive content to be presented on the display;
   determine one or more pieces of clickable content included in the received content; and
   for at least one piece of clickable content, rearrange this piece of clickable content with respect to the received content to be presented, such that the piece of clickable content will appear, when the received content is presented on the display, as a selectable item in a particular display subarea associated with a particular key of the keypad, and
   wherein the controller is configured to perform the rearranging as a result of a finding that the piece of clickable content would have appeared, when presented, at a display location which would not have fallen within any of the display subareas or at a display location which would have fallen within a display subarea that contains another piece of clickable content, and that the particular display subarea is available in the sense that it would not have contained a piece of clickable content.

2. The portable electronic apparatus of claim 1, wherein the sensor is touch-sensitive.

3. The portable electronic apparatus of claim 2:
   wherein the keypad comprises a keymat;
   wherein the touch-sensitive sensor comprises a capacitive sensor positioned beneath the keymat.

4. The portable electronic apparatus of claim 1, wherein the keys of the keypad are arranged such that at least a top part thereof is tactilely sensable when a user's finger is swept over the keypad area.

5. The portable electronic apparatus of claim 1, wherein the keys of the keypad are arranged to be physically depressible in a direction transverse to the first plane.

6. The portable electronic apparatus of claim 1, wherein the controller is configured to indicate the focus position in the form of a graphical marker symbol on the display.

7. The portable electronic apparatus of claim 1, wherein the keys of the keypad have a layout selected from the group consisting of ITU-T, full QWERTY, and compact QWERTY.

8. The portable electronic apparatus of claim 1, wherein the portable electronic apparatus is embodied as a mobile terminal.

9. The portable electronic apparatus of claim 8, wherein the mobile terminal is a mobile telephone for a mobile telecommunications system.

10. A portable electronic apparatus having:

a display;

a keypad having a plurality of keys, the keys being distributed within a keypad area in at least a first plane, and the keys being arranged for key-pressing user actuation transversally to the first plane so as to provide a first type of user input;

a sensor positioned to sense navigating user actuation at the keypad area in or coincident with the first plane so as to provide a second type of user input; and a controller configured to:

control a focus position on the display in response to user input of the second type;

associate a plurality of display subareas of the display with respective keys of the keypad; and accept, for user input of the second type, a key-pressing user actuation of an actuated key among the keys as a selection of a selectable item presented at the focus position in a particular display subarea associated with the actuated key, wherein the display subareas have predetermined display locations on the display;

wherein the controller is configured, in a cursor control mode intended for input of the second type, to:

determine one or more selectable items included in received content presented on the display;

compare location(s) of the determined selectable item(s) on the display to the predetermined display locations of the display subareas; and when a location of one of the determined selectable item(s) matches a predetermined display location of an available one of the display subareas, present on the display a graphical indication of the match, wherein the graphical indication of the match is presented as a boundary of the matching display subarea.

11. A method of controlling a user interface of a portable electronic apparatus having a display and a keypad with a plurality of keys distributed within a keypad area in at least a first plane, comprising:

sensing a navigating user actuation at the keypad area in the first plane;

controlling a focus position on the display in response to the sensed navigating user actuation;

associating a plurality of display subareas of the display with respective keys of the keypad;

detecting a key-pressing user actuation of an actuated key among the keys in a direction transverse to the first plane;

accepting the key-pressing user actuation as a selection of a selectable item presented at the focus position in a particular display subarea associated with the actuated key;

receive content to be presented on the display;

determining one or more pieces of clickable content included in the received content; and for at least one piece of clickable content, rearranging this piece of clickable content with respect to the received content to be presented, such that the piece of clickable content will appear, when the received content is presented on the display, as a selectable item in a particular display subarea associated with a particular key of the keypad, wherein the rearranging is performed as a result of a finding that the piece of clickable content would have appeared, when presented, at a display location which would not have fallen within any of the display subareas or at a display location which would have fallen within a display subarea that contains another piece of clickable content, and that the particular display subarea is available in the sense that it would not have contained a piece of clickable content.

12. The method of claim 11, further comprising indicating the focus position in the form of a graphical marker symbol on the display.

13. A method of controlling a user interface of a portable electronic apparatus having a display and a keypad with a plurality of keys distributed within a keypad area in at least a first plane, comprising:

sensing a navigating user actuation at the keypad area in the first plane;

controlling a focus position on the display in response to the sensed navigating user actuation;

associating a plurality of display subareas of the display with respective keys of the keypad;

detecting a key-pressing user actuation of an actuated key among the keys in a direction transverse to the first plane;

accepting the key-pressing user actuation as a selection of a selectable item presented at the focus position in a particular display subarea associated with the actuated key wherein the display subareas have predetermined display locations on the display, wherein the method further comprises;

determining one or more selectable items included in received content presented on the display;

comparing location(s) of the determined selectable item(s) on the display to the predetermined display locations of the display subareas; and when a location of one of the determined selectable item(s) matches a predetermined display location of an available one of the display subareas, presenting on the display a graphical indication of the match, wherein the graphical indication of the match is presented as a boundary of the matching display subarea.

* * * * *

UNITED STATES PATENT AND TRADEMARK OFFICE
CERTIFICATE OF CORRECTION

PATENT NO.         : 9,026,180 B2
APPLICATION NO.    : 13/735513
DATED              : May 5, 2015
INVENTOR(S)        : Jacob Ström Page 1 of 1

It is certified that error appears in the above-identified patent and that said Letters Patent is hereby corrected as shown below:

Title Page, in Item (12), under "United States Patent", in Column 1, Line 1, delete "Strom" and insert -- Ström --, therefor.

Title Page, in Item (72), under "Inventor", in Column 1, Line 1, delete "Strom," and insert -- Ström, --, therefor.

In the Drawings, Sheet 1 of 6 to Sheet 5 of 6 (Figs. 1-6b), delete "Fig" and insert -- Fig. --, therefor at each occurrence throughout the figures.

In the Specification

Column 1, Line 8, delete "12/809,373," and insert -- 12/809,373, now Pat. No. 8,351,992, --, therefor.

Column 9, Line 19, delete "keypad 342" and insert -- keypad 340 --, therefor.

In the Claims

Column 13, Line 53, in Claim 11, delete "receive" and insert -- receiving --, therefor.

Column 14, Line 41, in Claim 13, delete "comprises;" and insert -- comprises: --, therefor.

Signed and Sealed this
Twentieth Day of October, 2015

Michelle K. Lee
*Director of the United States Patent and Trademark Office*